United States Patent [19]
Haddock et al.

[11] Patent Number: 5,974,467
[45] Date of Patent: Oct. 26, 1999

[54] PROTOCOL FOR COMMUNICATING DATA BETWEEN PACKET FORWARDING DEVICES VIA AN INTERMEDIATE NETWORK INTERCONNECT DEVICE

[75] Inventors: Stephen R. Haddock, Los Gatos; Herb Schneider, San Jose; Daniel J. Cimino, Oak Park; Siddharth Khattar, Goleta; Matthew T. Knudstrup, Oak Park; Aaron C. Tyler, Thousand Oaks, all of Calif.

[73] Assignee: Extreme Networks, Santa Clara, Calif.

[21] Appl. No.: 09/032,803

[22] Filed: Feb. 27, 1998

Related U.S. Application Data
[60] Provisional application No. 60/058,019, Aug. 29, 1997.

[51] Int. Cl.$^6$ .......................... G06F 13/14; H04L 12/28; H04L 12/46
[52] U.S. Cl. .......................... 709/240; 370/236; 370/426; 370/412
[58] Field of Search ................... 370/230, 235, 370/236, 429, 412, 400, 231, 426; 709/238, 239, 240, 244, 243, 250

[56] References Cited

U.S. PATENT DOCUMENTS

| | | | |
|---|---|---|---|
| 5,042,032 | 8/1991 | Dighe et al. | 370/231 |
| 5,179,550 | 1/1993 | Simpson | 370/54 |
| 5,268,900 | 12/1993 | Hluchyj et al. | 370/429 |
| 5,355,364 | 10/1994 | Abali | 370/54 |
| 5,390,173 | 2/1995 | Spinney et al. | 370/60 |
| 5,402,416 | 3/1995 | Cieslak et al. | 370/60 |
| 5,453,979 | 9/1995 | Schibler et al. | 370/60.1 |
| 5,463,486 | 10/1995 | Stevens | 359/117 |
| 5,463,620 | 10/1995 | Sriram | 370/412 |
| 5,491,694 | 2/1996 | Oliver et al. | 370/85.4 |
| 5,500,858 | 3/1996 | McKeown | 370/60 |
| 5,633,867 | 5/1997 | Ben-Nun et al. | 370/399 |
| 5,689,644 | 11/1997 | Chou et al. | 395/200.06 |
| 5,710,893 | 1/1998 | Lindgreen | 710/131 |
| 5,742,604 | 4/1998 | Edsall et al. | 370/401 |
| 5,790,546 | 8/1998 | Dobbins et al. | 370/400 |
| 5,825,772 | 10/1998 | Dobbins et al. | 370/396 |

OTHER PUBLICATIONS

Koubias et al. "Mition: A MAC–Layer Hybrid Protocol for Multi–Channel Real Time LANs", ICECS '96 pp. 327–330.
Lin et al. "Internconnection of Large–Scale LANs via Two–Stage Switching HUB for Multimedia Applications", Local Computer Networks, 1994 proceedings, pp. 240–256.
International Search Report, PCT/US98/17975, 4 pages.
Y. Tamir & Hsin–Chou Chi "Symmetric Crossbar Arbiters For VLSI Communication Switches", IEEE Transactions on Parallel and Distributed Systems, vol. 4, No. 1, 1993 pp. 13–27.

(List continued on next page.)

*Primary Examiner*—Dung C. Dinh
*Attorney, Agent, or Firm*—Blakely, Sokoloff, Taylor & Zafman LLP

[57] ABSTRACT

A message exchange protocol for interconnecting packet forwarding devices through an intermediate network interconnect device is provided. According to one aspect of the present invention, a method is provided for communicating data between packet forwarding devices. The presence of an interconnect device that is coupled between a first packet forwarding device and a second packet forwarding device is detected by recognizing a configuration sequence, for example. After the link between the interconnect device and the first packet forwarding device is established, the first packet forwarding device receives a command from the interconnect device requesting the types of data that are pending on the first packet forwarding device. Responsive to the command, the first packet forwarding device transmits a "menu" including information indicating the availability of one or more types of data that are awaiting transmission to the interconnect device. An "order" is received by the first packet forwarding device from the interconnect device. The order includes information identifying a type of data being requested by the interconnect device. Responsive to the order, the first packet forwarding device transmits a message which contains data of the type identified by the order to the interconnect device.

18 Claims, 5 Drawing Sheets

OTHER PUBLICATIONS

R. O. LaMaire & D. N. Serpanos, "Two–Dimensional Round–Robin Schedulers For Packet Switches With Multiple Input Queues", IEEE/ACM Transactions On Networking, vol. 2, No. 5, Oct. 1997.

L.C. Lund, N. Reingold, "Fair Prioritized Scheduling In An Input–Buffered Switch", IEEE Conf. on Broadband Communications '96 Montreal, Apr. 1996, pp. 359–368.

J. Y. Hui & E. Arthurs, "A Broadband Packet Switch For Integrated Transport", IEEE Journal On Selected Areas In Communication, vol. SAC–5, Oct. 1987, pp. 1264–1272.

C. Partridge, P.P. Carvey, E. Burgess, I. Castineyra, T. Clarke, L. Graham, M. Hathaway, P. Herman, Allen King, S. Kohalmi, T. Ma, J. Mcallen, T. Mendez, W. C. Milliken, R. Pettyjohn, J. Rokosz, J. Seeger, M. Sollins, S. Storch, B. Tober, G. D. Troxel, D. Waitzman & S. Winterble, "A 50–Gb/s IP Router", IEEE/ACM Transactions On Networking, vol. 6, No. 3, Jun. 1998, pp. 237–248.

A. Demers, S. Keshav & Scott Shenker, "Analysis And Simulation Of A Fair Queueing Algorithm", Internetworking: Reseach and Experience, vol. 1 1990, pp. 3–26.

T. E. Anderson, S. S. Owicki, J. B. Saxe & C. P. Thacker, "High–Speed Switch Scheduling For Local–Area Networks", ACM Transactions On Computer Systems, vol. 11, No. 4. Nov. 1993, pp. 319–352.

M. M. Ali & H. Tri Nguyen, "A Neural Network Implementation Of An Input Access Scheme In A High–Speed Packet Switch", IEEE Global Telecommunications Conference & Exhibition, Nov. 1989, pp. 1192–1196.

Nick McKeown, "Fast Switched Backplane For A Gigabit Switched Router", Department of Electrical Engineering, Stanford University, pp. 1–30.

International Search Report, PCT/US98/19977, 4 pages.

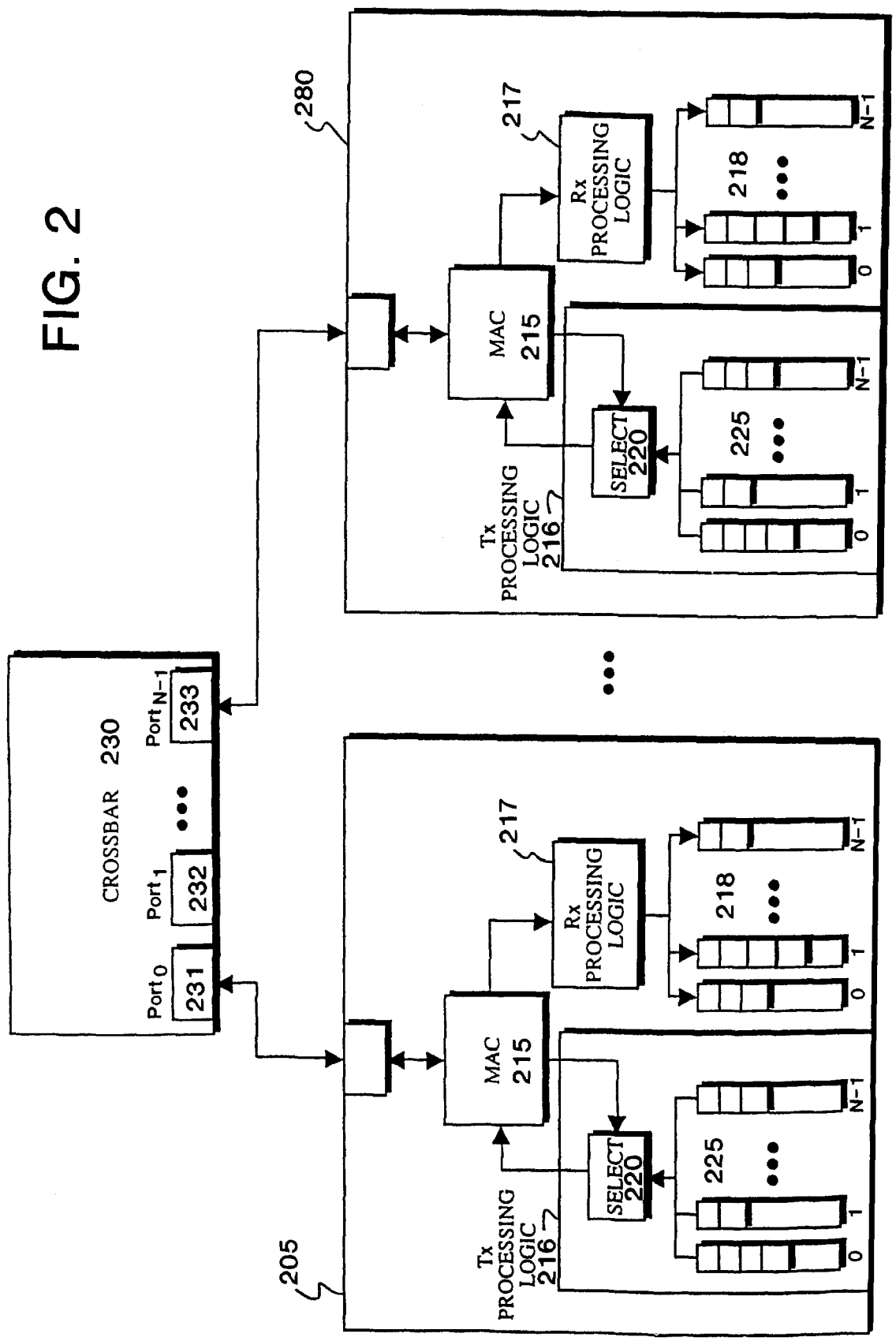

5,974,467

PROTOCOL FOR COMMUNICATING DATA BETWEEN PACKET FORWARDING DEVICES VIA AN INTERMEDIATE NETWORK INTERCONNECT DEVICE

This application claims the benefit of U.S. Provisional application Ser. No. 60/058,019, filed Aug. 29, 1997.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of computer networking devices. More particularly, the invention relates to a message exchange protocol for interconnecting packet forwarding devices through an intermediate network interconnect device.

2. Description of the Related Art

Local Area Network (LAN) switches are typically employed to solve congestion problems associated with LANs that arise as workgroups and networks, such as an Ethernet, grow. (The terms Ethernet LAN, or simply Ethernet, Fast Ethernet LAN, or simply Fast Ethernet, Gigabit Ethernet LAN, or simply Gigabit Ethernet, as used herein shall apply to LANs employing Carrier Sense, Multiple Access with Collision Detection (CSMA/CD) as the medium access method, generally operating at a signaling rate of 10 Mb/s, 100 Mb/s, and 1,000 Mb/s, respectively over various media types and transmitting Ethernet formatted or Institute of Electrical and Electronic Engineers (IEEE) standard 802.3 formatted data packets). Switches reduce congestion, for example, by segmenting workgroups into different LANs having separate collision domains and switching traffic, i.e., data packets, between the workgroups at very high speeds.

Switches are generally offered as part of either a pure stackable or pure chassis-based product line thereby forcing network managers to choose between stackable or chassis switching. There are advantages to both approaches. For instance, stackable switches offer flexibility and low entry-cost, while chassis-based switches offer fault tolerance and high port-density.

What is needed is a combination of stackable and chassis switching technology, which will provide network managers an incremental way to build faster, more manageable networks. Additionally, as intranet requirements grow throughout an enterprise, it is desirable to have available a cost-effective migration path that allows the port density, fault tolerance and performance of LAN switches to scale dramatically. More particularly what is needed are packet forwarding devices, e.g. switches, and network interconnect devices (which may serve individually or coupled in parallel as an external backplane, for example) that are designed to bring together the flexibility and low entry-cost of a stackable system and the fault tolerance and high port-density of a chassis-based system. Further, it would be advantageous to provide a communication mechanism, such as a handshaking protocol or the like, to reduce the need for packet buffering and to simplify packet forwarding logic within the network interconnect device, thereby allowing such a network interconnect device to be manufactured at a reasonable cost.

BRIEF SUMMARY OF THE INVENTION

A message exchange protocol for interconnecting packet forwarding devices through an intermediate network interconnect device is described. According to one aspect of the present invention, a method is provided for communicating data between packet forwarding devices. The presence of an interconnect device that is coupled between a first packet forwarding device and a second packet forwarding device is detected. A first message including information indicating one or more types of data that are awaiting transmission is transmitted from the first packet forwarding device to the interconnect device. A second message is received by the first packet forwarding device from the intermediate network device. The second message includes information selecting a type of data to be transferred to the intermediate network device. Responsive to the second message, the first packet forwarding device transmits a third message that contains data of the type identified by the second message to the interconnect device. Advantageously, handshaking between the packet forwarding devices and the interconnect device reduces the buffering requirements at the interconnect device.

According to another aspect of the present invention, an alternative method is provided for communicating data between packet forwarding devices. A first packet forwarding device transmits a message to an interconnect device that is coupled between the first packet forwarding device and a second packet forwarding device. The message contains information indicating the availability of data destined for the second packet forwarding device. The first packet forwarding device receives a command from the interconnect device. The command includes a field for selecting requested data. If the field selects the data destined for the second packet forwarding device, then the first packet forwarding device transfers the data requested to the second packet forwarding device by transmitting a message containing the data requested to the interconnect device.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which:

FIG. 2 illustrates two packet forwarding devices coupled in communication through a crossbar according to one embodiment of the present invention.

DETAILED DESCRIPTION OF THE INVENTION

A message exchange protocol for interconnecting packet forwarding devices through an intermediate network interconnect device, such as a crossbar switch is described. In the following description, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by special purpose hardware components or may be embodied in machine-executable instructions, which may be used to cause a general-purpose or special-purpose processor programmed with the instructions to perform the steps. Alternatively, the steps may be performed by a combination of hardware and software. While, embodiments of the present invention will be described with reference to a high speed Ethernet switch, the method and apparatus described herein are equally applicable to other types of network devices that forward packets among other network devices, such as routers, bridges, brouters, and the like.

An Exemplary Switch Architecture

Figure 1:
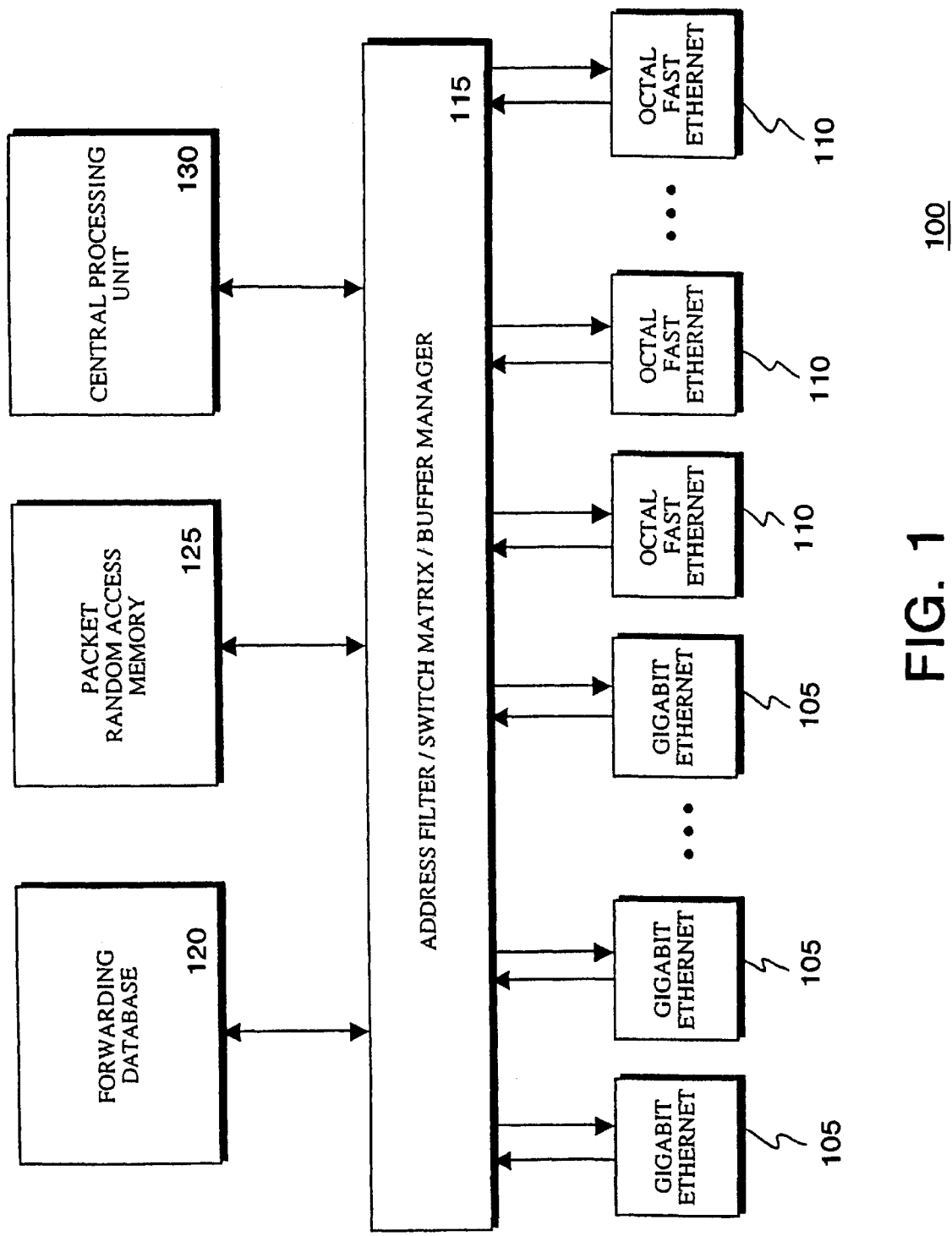
FIG. 1 is a simplified block diagram of an exemplary switch architecture in which one embodiment of the present invention may be implemented.

An overview of the architecture of a switch 100 in which one embodiment of the present invention may be implemented is illustrated by FIG. 1A. The central memory architecture depicted includes multiple ports 105 and 110 each coupled via a channel to a filtering/forwarding engine 115. Also coupled to the filtering/forwarding engine 115 is a forwarding database 120, a packet Random Access Memory (RAM) 125, and a Central Processing Unit (CPU) 130.

Each channel is capable of supporting a data transfer rate of one gigabit per second in the transmit direction and one gigabit per second in the receive direction, thereby providing 2 Gb/s full-duplex capability per channel. The channels may be configured to support one Gigabit Ethernet network connection or eight Fast Ethernet network connections.

The filtering/forwarding engine 115 includes an address filter (not shown), a switch matrix (not shown), and a buffer manager (not shown). The address filter may provide bridging, routing, Virtual Local Area Network (VLAN) tagging functions, and traffic classification. The switch matrix connects each channel to a central memory such as packet RAM 125. The buffer manager controls data buffers and packet queue structures and controls and coordinates accesses to and from the packet RAM 125.

The forwarding database 120 may store information useful for making forwarding decisions, such as layer 2 (e.g., Media Access Control (MAC) layer), layer 3 (e.g., Network layer), and/or layer 4 (e.g., Transport layer) forwarding information, among other things. The switch 100 forwards a packet received at an input port to an output port by performing a search on the forwarding database using address information contained within the header of the received packet. If a matching entry is found, a forwarding decision is constructed that indicates to which output port the received packet should be forwarded, if any. Otherwise, the packet is forwarded to the CPU 130 for assistance in constructing a forwarding decision.

The packet RAM 125 provides buffering for packets and acts as an elasticity buffer for adapting between incoming and outgoing bandwidth differences. Packet buffering is discussed further below.

An Exemplary Communication Network

Having described an exemplary switch, FIG. 2 illustrates two packet forwarding devices coupled in communication through a crossbar according to one embodiment of the present invention. In the embodiment depicted, a first packet forwarding device 205 and a second packet forwarding device 280 are coupled to a network device capable of transferring data from any input port to any output port such as crossbar 230. Both the first and second packet forwarding devices (205 and 280) include a media access controller (MAC) 215, transmit logic 216, and receive logic 217.

The MAC 215 is capable of operating in at least a first and a second mode. In a first mode, "normal" mode or "direct connect" mode, the MAC 215 is configured to receive and transmit data (within variable length packets, for example) formatted according to a first protocol, such as Ethernet. In a second mode, "crossbar interconnect" mode, the MAC 215 is configured to receive and transmit data formatted according to a second protocol ("message exchange protocol"). According to one embodiment, regardless of the mode of the MAC 215, standard Ethernet physical layer encoding is employed. For example, the same physical encoding scheme as the Gigabit Ethernet physical sublayer may be used. The format of message exchange protocol "cells" and handshaking between the MAC 215 and the crossbar 230 are discussed further below.

While in direct connect mode, if the MAC 215 detects the presence of the crossbar 230, the MAC 215 puts itself into crossbar interconnect mode and processes message exchange protocol "cells" according to the message exchange protocol. Similarly, while in crossbar interconnect mode, if the MAC 215 determines no crossbar 230 is present, then it puts itself into direct connect mode and processes Ethernet frames, for example.

The transmit logic 216 is coupled to the MAC 215 and supplies the raw data to be transmitted by the MAC 215. In this embodiment, the transmit logic 216 includes multiple destination queues 225 and a destination queue selector 220. Each destination queue corresponds to a port (231–233) of the crossbar 230. While in crossbar interconnect mode, the packet forwarding device (205 or 280) separates transmit traffic for a particular destination address according to the corresponding destination port on the crossbar. That is, data destined for a device coupled to port X of the crossbar 230 is buffered in destination queue X. It will be appreciated, therefore, that the packet forwarding device (205 or 280)

includes learning logic (not shown) for learning crossbar ports (e.g., associating particular crossbar ports with particular media access control destination addresses during receive processing).

Selector 220 is interposed between the destination queues 225 and the MAC 215. Selector 220 allows data from a selected one of the destination queues 225 to pass through to the MAC 215 based upon input from the MAC 215. Logic for implementing such a selector is well known. Selector 220 may be implemented with a MUX, for example.

Also coupled to the MAC 215 is receive processing logic 217. According to the embodiment depicted, the receive processing logic 217 separates the received cells into N source queues 218 based upon the source crossbar port, where N is the number of crossbar ports. It is appreciated more or less source queues 218 may be employed depending upon the implementation. For example, if an implementation does not support looping data back to the originating port, then one less queue could be maintained.

In one embodiment, the crossbar 230 may represent a chassis backplane in which packet forwarding devices embodied in chassis add-in cards, for example, may be installed. While in another embodiment, the crossbar 230 may represent a stand alone box that may be coupled through appropriate cabling (e.g., fiber) to packet forwarding devices such as an Ethernet switch 100 capable of supporting 10 Mbps, 100 Mbps, and 1 Gbps channels.

Exemplary Cell Windows and Cell Format

Figure 3A:
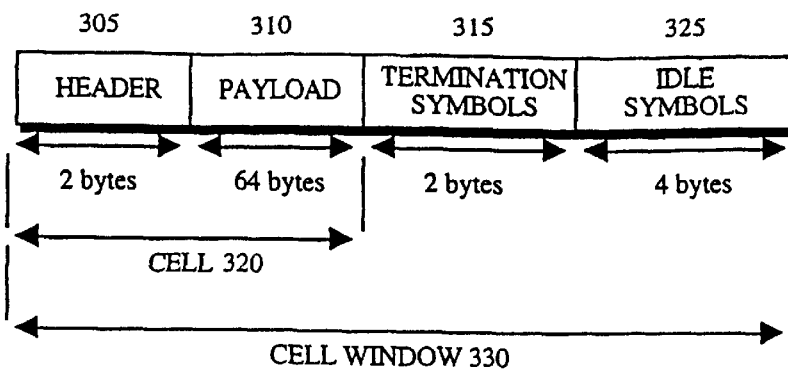
FIG. 3A illustrates a cell format and cell window according to one embodiment of the present invention.

According to one embodiment, messages referred to as "cells" may be employed to implement the message exchange protocol including the communication of menus and orders. FIG. 3A illustrates a cell format and cell window according to one embodiment of the present invention. According to this embodiment, the message exchange protocol cell window includes a cell 320 and zero or more idle symbols 325. The cell 320 contains a header 305, a payload 310, and one or more termination symbols 315.

The header 305, as described in further detail below, may be used to communicate control information between the crossbar 230 and the packet forwarding device (205 or 280). The payload 310 follows the header and includes data destined for another packet forwarding device coupled to the crossbar 230. After the payload 310, one or more termination symbols 315 may be employed to indicate the end of valid data.

Alternative configurations and arrangements of the cell portions are contemplated. In other embodiments, for example, the cell fields need not follow the order depicted in this embodiment. Further, it is appreciated that the message exchange protocol may be implemented with more or less fields than depicted in this embodiment.

Figure 3B:
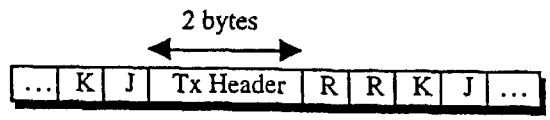
FIG. 3B illustrates a cell window containing a cell transmitted by a packet forwarding device in response to a null command or false command by an interconnect device according to one embodiment of the present invention.

FIG. 3B illustrates a cell window containing a cell 340 transmitted by a packet forwarding device in response to a null command or false command by an interconnect device according to one embodiment of the present invention. In this example, the cell 340 carries only a 2 byte transmit header. "Null" and "false" commands/orders will be described below. According to this embodiment, no data is transmitted in response to null or false commands/orders.

Figure 3C:
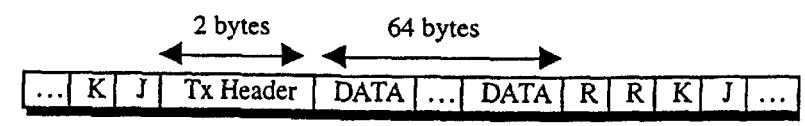
FIG. 3C illustrates a cell window containing a cell transmitted by a packet forwarding device that does not contain the last byte of a packet according to one embodiment of the present invention.

FIG. 3C illustrates a cell window containing a cell 350 transmitted by a packet forwarding device that does not contain the last byte of a packet according to one embodiment of the present invention. Before discussing this and other examples, it should be understood that two termination symbols are employed by the embodiment depicted, a "T" symbol and an "R" symbol. The end of a frame (e.g., a link layer Ethernet frame) is indicated by a "T" followed by an "R" rather than two "R" symbols. In this example, the cell 350 includes a 2 byte transmit header and 64 bytes of data followed by two "R" termination symbols. Therefore, the interconnect device will expect at least one more cell to complete the packet.

Figure 3D:
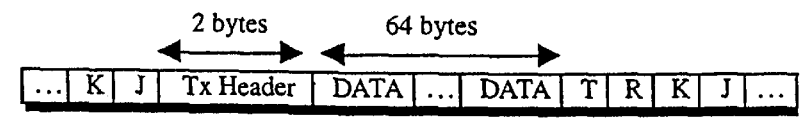
FIG. 3D illustrates a cell window containing a cell transmitted by a packet forwarding device that contains the last byte of a packet according to one embodiment of the present invention.

FIG. 3D illustrates a cell window containing a cell 360 transmitted by a packet forwarding device that contains the last byte of a packet according to one embodiment of the present invention. In this example, the cell 360 includes a 2 byte transmit header and 64 bytes of data followed by a "T" termination symbol and an "R" termination symbol. As described above, this combination of termination symbols signifies the end of a frame according to this embodiment.

Figure 3E:
FIG. 3E illustrates a cell window containing a command cell received from an interconnect device with no data present according to one embodiment of the present invention.

FIG. 3E illustrates a cell window containing a command cell 370 received from an interconnect device with no data present according to one embodiment of the present invention. In this example, the cell 370 carries only a 2 byte receive header. The receive header may be requesting a "menu" from the packet forwarding device or sending an "order" for a particular type of data that is pending in one of the destination queues 225. orders and menus will be described below.

Figure 3F:
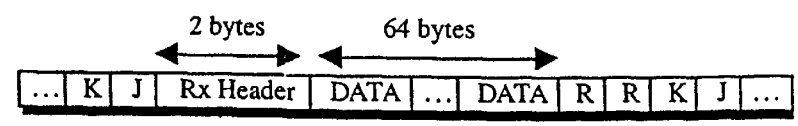
FIG. 3F illustrates a cell window containing a command cell received from an interconnect device that does not contain the last byte of a packet according to one embodiment of the present invention.

FIG. 3F illustrates a cell window containing a command cell 380 received from an interconnect device that does not contain the last byte of a packet according to one embodiment of the present invention. The cell 380 is shown carrying a 2 byte receive header and 64 bytes of data followed by two "R" termination symbols. Therefore, the interconnect device is expected to transmit at least one more cell to complete this packet.

Figure 3G:
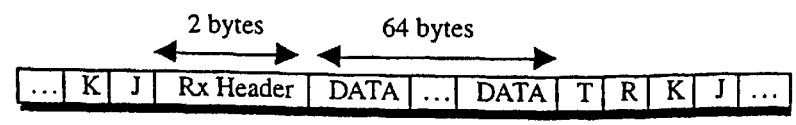
FIG. 3G illustrates a cell window containing a command cell received from an interconnect device that contains the last byte of a packet according to one embodiment of the present invention.

FIG. 3G illustrates a cell window containing a command cell 390 received from an interconnect device that contains the last byte of a packet according to one embodiment of the present invention. This example corresponds to the cell being transmitted in FIG. 3D, the cell 390 is shown carrying a 2 byte receive header and 64 bytes of data followed by a "T" termination symbol and an "R" termination symbol. According to this embodiment, because the "T" termination symbol follows the last data byte, this cell 390 is recognized as containing the last byte of packet data.

Importantly, the payload 310 need not always be filled with valid data nor does the payload 310 have to have a fixed size. To accomodate packets of a size that is not an integer multiple of the payload size (64 bytes in the examples above), the unused portion of payload 310 may be padded with null symbols or "R" termination symbols, for example. Alternatively, the payload size may be variable. In which case, remainder of the cell window 330 may be filled with additional "R" termination symbols or idle symbols.

Exemplary Cell Header Formats

Figure 4A:
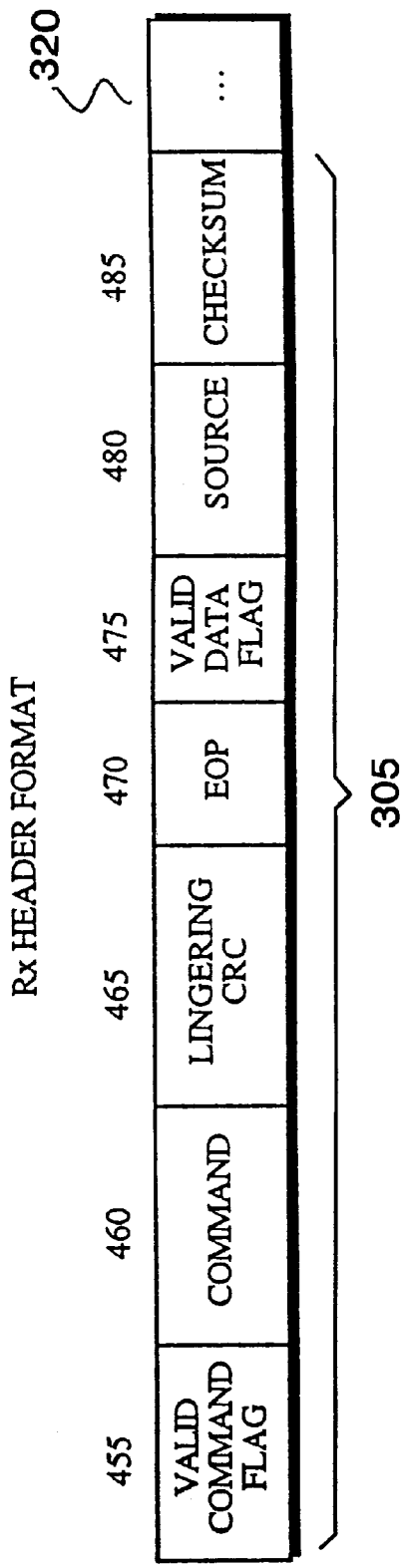
FIG. 4A illustrates a transmit cell header format according to one embodiment of the present invention.

FIG. 4A illustrates a transmit cell header format according to one embodiment of the present invention. The transmit cell header 305, according to the embodiment depicted, includes a valid data flag field 405, a destination indication field 410, a lingering CRC field 415, an end of packet (EOP) field 420, a checksum field 425, and a menu field 430.

When set, the valid data flag field 405 indicates that the cell contains valid data and is not merely a response to a null or false order, which does not include a payload 310. If the valid data flag field 405 is set, the destination indication field 410 contains a binary encoding of the destination port of the crossbar 230 to which the destination packet forwarding device is coupled. In this embodiment, the crossbar 230 is assumed to have 8 ports, therefore, the destination indication field 410 is a 3-bit encoding. If the valid data flag field 405 is not set, then the cell 320 only contains valid data in the menu field 430. That is, the destination indication field 410 should be ignored and no data is included in the payload 310 of the cell 320. While in this embodiment, the types of data awaiting transmission at a particular packet forwarding device 205, 280 are characterized by the data's destination, e.g., the crossbar port 231–233 to which the destination endnode is coupled, various other ways of characterizing types of data will be apparent to those of ordinary skill in the art.

The lingering CRC field 415 is asserted when the cell being sent to the crossbar 230 contains the last valid data for the current packet, but the length of the data prevented the CRC from being transmitted in the current cell 320. Therefore, the lingering CRC field 415 indicates the CRC for the current packet will be contained in the next cell for the indicated destination.

The EOP field 420 is set when the last valid data for the current packet is being transmitted. In cases of lingering CRC, the EOP field 420 is set in the cell containing the last bytes of valid data, and not in a cell containing only the CRC.

According to one embodiment, the checksum field 425 is a 2-bit checksum for detecting bit errors in the header bits including the lingering CRC field 415, the EOP field 420, the destination indication field 410, and the valid data flag field 405. The checksum field 425 may be determined by XORing predetermined pairs of bits for the data fields covered, for example, or by other well known methods of checksum generation.

According to the embodiments discussed herein, the menu field 430 is an N-bit, bit-masked character. An asserted bit at a particular bit position in the menu indicates the availability of data for the corresponding one of N ports of the crossbar 230. For example, a packet forwarding device that has data to send to both the packet forwarding devices attached to ports 0 and 5 of the crossbar 230, then the packet forwarding device will set bits 0 and 5 of the menu field 430. Some issues involved in determining whether or not to set a particular bit in the menu are discussed below.

Figure 4B:
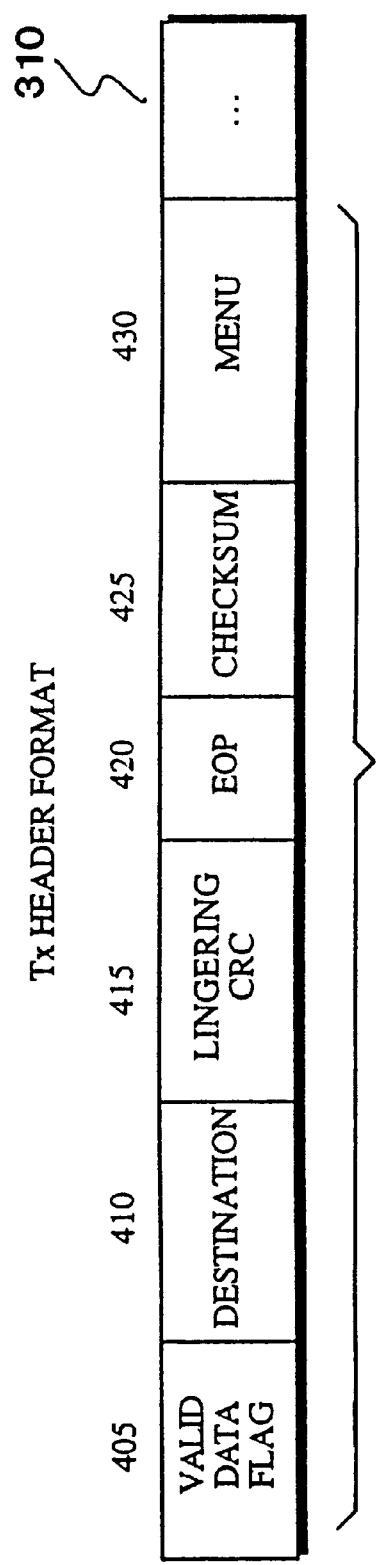
FIG. 4B illustrates a receive cell header format according to one embodiment of the present invention.

FIG. 4B illustrates a receive cell header format according to one embodiment of the present invention. The receive cell header field 450, according to the embodiment depicted, includes a valid command flag field 455, a command field 460, a lingering CRC field 465, an EOP field 470, a valid data flag field 475, a source indication field 480, and a checksum field 485.

The valid command flag field 455 is set to indicate that the cell 320 contains a valid command (e.g., an "order" from the previously provided "menu").

The command field 460 is a binary encoding of the crossbar destination port for which data is being requested by the crossbar 230. As above, in this embodiment, the crossbar 230 is assumed to have 8 ports, therefore, the command indication field 460 is a 3-bit encoding.

As above, the lingering CRC field 465 is asserted when the CRC for the current packet will be contained in the next cell for this port.

The EOP field 470 is set when the last valid data for the current packet is being received. Again, in cases of lingering CRC, the EOP field 470 is set only when the last valid data is being transmitted by the crossbar 230, and is not set when the payload 310 contains only a CRC.

The valid data flag field 475 is set to indicate the cell 320 contains valid data in the payload 310.

The source indication field 480 is a binary encoding of the source port of the crossbar 230 to which the source packet forwarding device is coupled. In this embodiment, the crossbar 230 is assumed to have 8 ports, therefore, a 3-bit encoding is sufficient. It is appreciated that the number of bits used to encode the crossbar ports may be increased to accommodate an increased number of crossbar ports or decreased to encode less ports.

The checksum field 485 is a 4-bit checksum for detecting bit errors in the above data fields of the header 305. The checksum field 485 may be determined by XORing predetermined sets of four bits for the data fields covered, for example, or by other well known methods of checksum generation.

Link Configuration

As discussed above, the MAC 215 is capable of operating in either a normal mode or a crossbar interconnect mode. According to the present embodiment, the MAC 215 establishes a valid link between the crossbar 230 and the packet forwarding device (205 or 280) by detecting a predetermined configuration sequence transmitted by the crossbar 230. Upon detecting the predetermined configuration sequence, the packet forwarding device (205 or 280) begins transmitting idle symbols to the crossbar 230 until the crossbar 230 begins requesting menus.

Crossbar-Packet Forwarding Device Handshaking

Figure 5:
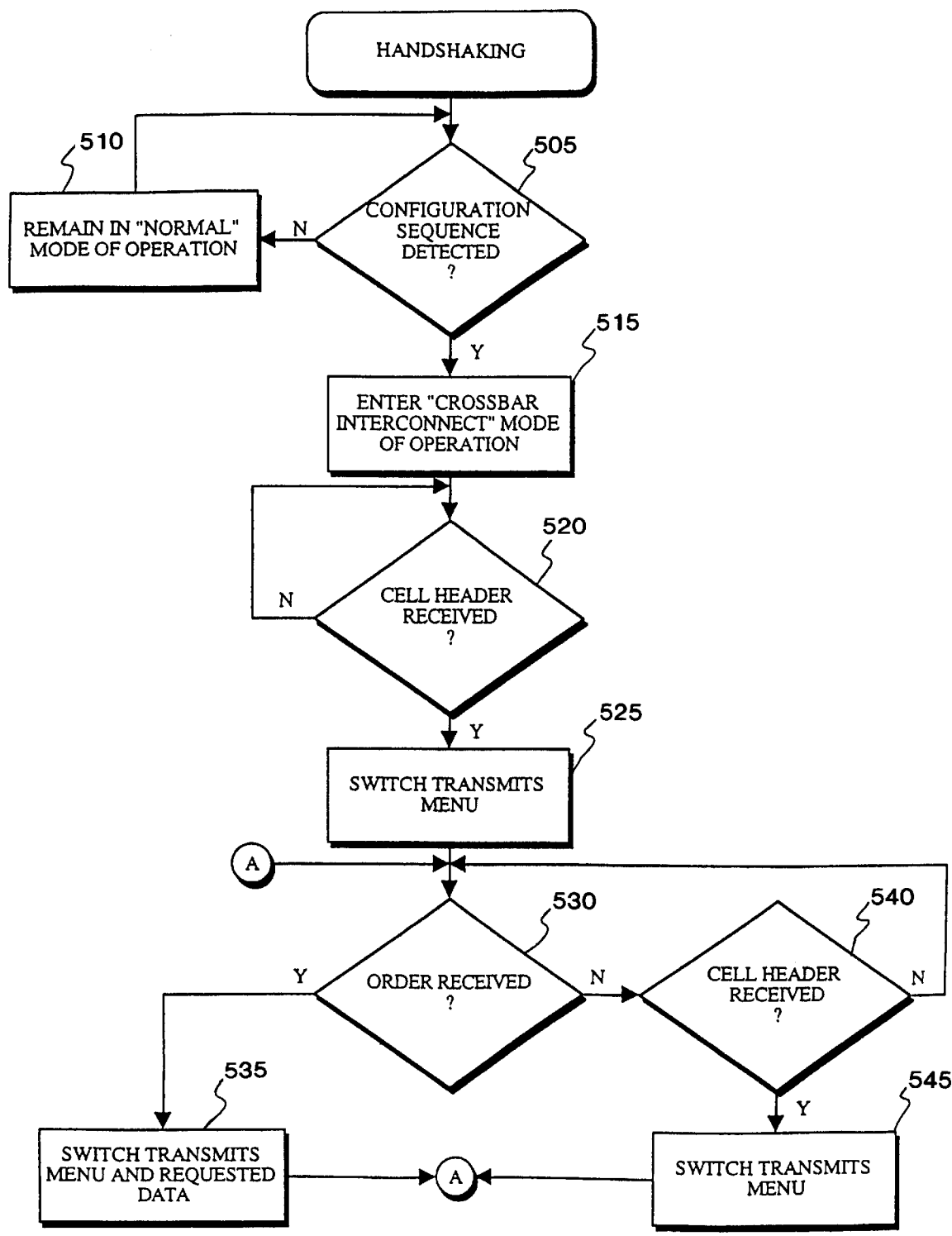
FIG. 5 is a flow diagram illustrating handshaking processing from the perspective of the packet forwarding device according to one embodiment of the present invention.

FIG. 5 is a flow diagram illustrating handshaking processing from the perspective of the packet forwarding device according to one embodiment of the present invention. The steps described below represent exemplary handshaking that may be performed for each port of the packet forwarding device. The steps may be performed under the control of a programmed processor, such as CPU 130, or the logic may be implemented and distributed among hardware within the MAC 215, the transmit processing logic 216, and the receive processing logic 217, for example.

At step 505, the packet forwarding device determines if the predetermined configuration sequence has been received. If not, the port remains in the normal mode of operation, step 510, processes any received data in accordance with the first protocol, and continues to monitor the link for the predetermined configuration sequence.

If the configuration sequence was detected at step 505, then at step 515, the port enters the crossbar interconnect mode of operation. For example, CPU 130 may configure the MAC 215 to begin processing packets according to the crossbar interconnect mode. In alternative embodiments, the MAC 215 may be preconfigured to operate in accordance with the crossbar interconnect mode without having to first detect the existence of the interconnect device.

At step 520, the packet forwarding device determines whether or not a receive header has been received from the crossbar 230.

At step 525, responsive to the receive header detected at step 520, the packet forwarding device transmits a menu indicating the type of data that is available for transmission from the particular port at which the header was received. It is worthy of noting at this point that two options are available when the packet forwarding device is asked to advertise the type of data it currently has available. The first option is to only advertise a particular type of data (e.g., data destined for a particular crossbar output port) once. This option is acceptable if the crossbar 230 maintains a history of menus for tracking which ports have data available. To relieve the crossbar 230 of this responsibility, the packet forwarding device, according to the second option, may re-advertise a particular type of data if the data is still present at the time the port is assembling the menu. Since a transmit cell header is transmitted with every payload, this second approach is more robust due to the increased tolerance for lost or corrupted menus without sacrificing bandwidth on the link. One side effect of the second option, however, due to link latency, is the crossbar 230 may order data that is no longer in the destination queues 225. This is easily handled by configuring the packet forwarding device to ignore orders for data that is not present (e.g., "false" orders).

Steps 530 and 540 wait for either an "order" or a cell header ("command") to be received from the crossbar 230. Typically the crossbar 230 responds to the menu transmitted at step 525 with a cell referred to as an "order." The order indicates which of the advertised types of data the crossbar 230 would like the packet forwarding device to transmit next. However, if the menu was corrupted during transmission or some other error occurs, the crossbar 230 may send another command requesting a menu from the packet forwarding device. In this case, at step 545, the packet forwarding device determines the current type of data that is available for transmission and transmits a menu indicating the types of data available to the crossbar 230. When an order is received, a new menu and the data requested by the order will be transmitted to the crossbar 230 at step 535.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of communicating data between packet forwarding devices through an interconnect device, the method comprising the steps of:

transmitting a first message from a first packet forwarding device to the interconnect device, the message having stored therein information indicating the availability of one or more types of data that are awaiting transmission;

receiving at the first packet forwarding device a second message from the interconnect device, the second message having stored therein information selecting a type of the one or more types of data; and transferring data of the type selected by the second message from the first packet forwarding device to a second packet forwarding device by transmitting a third message containing the selected data from the first packet forwarding device to the interconnect device responsive to the second message.

2. The method of claim 1, further including the step of detecting the presence of the interconnect device coupled between the first packet forwarding device and a second packet forwarding device.

3. The method of claim 1, further including the step of separating data awaiting transmission at the first packet forwarding device into one or more groups based upon the one or more types of data.

4. The method of claim 1, wherein the one or more types of data comprise data destined for one or more ports of the interconnect device.

5. The method of claim 4, further including the step of separating data awaiting transmission at the first packet forwarding device into one or more groups based upon a port of the interconnect device for which the data is destined.

6. A method of communicating data between packet forwarding devices, the method comprising the steps of:

transmitting a message from the first packet forwarding device to an interconnect device, the interconnect device interconnecting a plurality of packet forwarding devices including the first packet forwarding device and a second packet forwarding device, the message having stored therein information indicating the availability of data destined for one or more of the plurality of packet forwarding devices;

receiving at the first packet forwarding device a command from the interconnect device, the command containing information selecting data destined for the second packet forwarding device of the plurality of packet forwarding devices; and transferring the data from the first packet forwarding device to the second packet forwarding device by transmitting a message containing the data from the first packet forwarding device to the interconnect device responsive to the command.

7. The method of claim 6, wherein communications between the first packet forwarding device and the interconnect device employ a standard Ethernet physical layer encoding.

8. The method of claim 7, wherein the standard Ethernet physical layer encoding comprises the Gigabit Ethernet physical sublayer.

9. The method of claim 6, wherein the information indicating the availability of data destined for one or more of a plurality of other packet forwarding devices is encoded in the form of a bit-mask.

10. A method of communicating data between packet forwarding devices, the method comprising the steps of:

separating data awaiting transmission at a first packet forwarding device into one or more groups based upon a port of an interconnect device for which the data is destined;

advertising groups of the one or more groups that have pending data by transmitting a menu message to the interconnect device;

receiving at the first packet forwarding device a request from the interconnect device, the request selecting a group of the one or more groups for which data is being requested;

retrieving data from the selected group; and transmitting the data in a message from the first packet forwarding device to the interconnect device responsive to the request.

11. The method of claim 10, further including the step of detecting the presence of an interconnect device coupled between the first packet forwarding device and a second packet forwarding device.

12. The method of claim 10, wherein the groups of the one or more groups that have pending data are advertised without regard for previous advertising of the pending data.

13. The method of claim 10, wherein the step of advertising groups of the one or more groups that have pending data by transmitting a menu message to the interconnect device further includes the steps of:

determining if data in any of the groups of the one or more groups that have pending data has previously been advertised; and excluding from the menu message those groups that include pending data that has previously been advertised.

14. A packet forwarding device comprising:

a port having a normal mode and an interconnect mode, the port including a receive processing unit configured to process data received by the port, a media access controller (MAC) coupled to the receive processing unit, the MAC configured to operate according to the interconnect mode after detecting the presence of an interconnect device, in the interconnect mode, the MAC selecting data for transmission to the interconnect device based upon commands received from the interconnect device, and a transmit processing unit coupled to the MAC, the transmit processing unit configured to provide data for transmission to the MAC.

15. The packet forwarding device of claim 14, wherein the MAC is further configured to advertise data pending for ports of the interconnect device by transmitting a menu message to the interconnect device.

16. The packet forwarding device of claim 14, wherein the transmit processing unit includes a queue corresponding to each port of the interconnect device, and the transmit processing unit is further configured to separate data received for transmission on the port into an appropriate queue based upon a destination port of the interconnect device to which the data is addressed.

17. The packet forwarding device of claim 14, wherein the port is configured to employ standard Ethernet physical layer encoding.

18. The packet forwarding device of claim 17, wherein the standard Ethernet physical layer encoding comprises the Gigabit Ethernet physical sublayer.

* * * * *